United States Patent [19]

Dome

[11] 3,808,556

[45] Apr. 30, 1974

[54] VARIABLE CAPACITOR, ESPECIALLY FOR TEMPERATURE-COMPENSATED ELECTRONIC TIMEPIECE

[75] Inventor: Peter Dome, Brugg Bei Biel, Switzerland

[73] Assignee: Societe Suisse pour l'Industrie Horlogere SA, Geneve, Switzerland

[22] Filed: Dec. 4, 1972

[21] Appl. No.: 311,700

[30] Foreign Application Priority Data

Dec. 2, 1971 Switzerland ........................ 17570/71

[52] U.S. Cl. ............... 331/116 R, 317/248, 331/176

[51] Int. Cl. ............................................ H03b 5/32

[58] Field of Search ........... 331/116 R, 116 M, 176; 317/247, 248

[56] References Cited

UNITED STATES PATENTS 3,659,165 4/1972 Dome ................................ 317/249

*Primary Examiner*—John Kominski

*Attorney, Agent, or Firm*—Karl F. Ross; Herbert Dubno

[57] ABSTRACT

An electronic watch or other timepiece has a clockwork driven by an electronic oscillator having a quartz crystal. A variable trimmer condenser is connected in parallel with this crystal for adjusting the operating frequency of the oscillator and hence the accuracy of the watch. A counter-electrode or armature closely spaced from a fixed plate of this trimmer condenser is carried on or forms part of a bimetallic strip which normally lies against an abutment in the condenser housing so that only when the ambient temperature passes a predetermined threshold does the strip pull away from the abutment and later the capacitance of the condenser, thereby changing the operating frequency of the oscillator in a manner calculated to compensate for the effects of temperature variations on the crystal and to maintain that frequency stable within narrow limits. The strip can be arranged to make such compensation above or below the threshold whose value can be adjusted with the aid of the coacting setscrew.

10 Claims, 8 Drawing Figures

VARIABLE CAPACITOR, ESPECIALLY FOR TEMPERATURE-COMPENSATED ELECTRONIC TIMEPIECE

FIELD OF THE INVENTION

My present invention relates to a variable capacitor to be used as s trimmer condenser for an electric clockwork, in an electronic timepiece such as a wristwatch, as disclosed in my prior U.S. Pat. No. 3,659,165.

BACKGROUND OF THE INVENTION

It is known to connect such a trimmer condenser in circuit with a piezoelectric crystal, such as a quartz of so-called AT cut, to enable accurate adjustment of the operating frequency of an oscillator controlling the clockwork. This operating frequency, however, tends to vary with ambient temperature so that corrective measures are needed to stabilize the oscillator frequency within narrow limits. In practice, the deviations from the adjustment frequency should not exceed ±0.1 second per day in a watch designed to be marketed as a precision timepiece.

Prior attempts to compensate for the temperature-responsive frequency variations of a crystal-controlled oscillator have involved the use of a supplemental capacitance controlled by a thermosensitive element such as a bimetallic strip. Such a strip can be used, for example, to rotate a movable condenser plate about an axis with reference to an associated fixed condenser plate. It is also possible to mount the movable condenser plate directly on the bimetallic strip, or to make it part of the strip itself, in such a way that thermal deformation of the strip changes the distance between the plates and therefore their capacitance. The displacement of the movable condenser plate by such a thermally deformable element, and therefore the resulting change in capacitance, is a substantially linear function of temperature unless, with a rotating plate as mentioned above, the shape of that plate and/or of the associated stationary plate is so chosen as to provide a specific nonlinear temperature dependency. Such a nonlinear relationship is necessary for proper frequency stabilization inasmuch as the frequency of a crystal-controlled oscillator is also a nonlinear function of temperature. With an AT-cut quartz crystal, for example, this function is a third-order curve with a near-linear portion centered on an inversion point.

With the aid of a trimmer condenser of the type disclosed in my aforementioned U.S. Pat. No. 3,659,165, which may be connected in parallel with the frequency-determining crystal, it is possible to adjust the operating frequency of the oscillator so that the inversion point of the curve lies about midway in a range of ambient temperatures in which it is desired to stabilize that frequency between narrow limits of, say, ±0.1 sec./day. Thus, if the inversion point lies at 30°C, the stabilized temperature range may extend between about +10°C and +60°C. Owing to manufacturing tolerances, however, these limits may shift considerably for different crystals, varying for example between +5°C and +15°C at the lower end of the range. As a result, the superposition of a thermally variable supplemental capacitance as discussed above upon the capacitance of the crystal — even with nonlinear temperature dependency — may extend that range for some crystals but may have a detrimental effect with other crystals having a slightly different characteristic.

OBJECTS OF THE INVENTION

It is, therefore, an object of my present invention to provide an improved trimmer condenser designed to establish a wide temperature range of stabilized oscillator frequencies as defined above.

A more particular object is to provide a trimmer condenser of this character enabling substantial extension of such a range toward either the lower or the upper temperatures.

It is also an object to provide an improved trimmer condenser of the type disclosed and claimed in my prior U.S. Pat. No. 3,659,165, designed for vernier adjustment of the oscillator frequency, with means for holding that frequency stable throughout a desired temperature range despite deviations in the frequency characteristic of an associated piezoelectric crystal from a predetermined reference curve.

SUMMARY OF THE INVENTION

A trimmer condenser according to my invention, adapted to realize the aforestated objects, comprises a pair of relatively adjustable plates along with a thermally deformable element provided with a conductive portion or armature which may be integral therewith or carried thereon and which constitutes a counterelectrode confronting one of the two condenser plates, preferably the stationary one, to define a supplemental capacitance therewith. In a position corresponding to a predetermined temperature threshold within the desired range of stabilization, this thermally deformable element engages stop means preventing the thermal displacement of the counterelectrode within a band of temperatures, either rising or falling, beyond that threshold. Within that band, therefore, the supplemental capacitance of the trimmer condenser remains constant whereas in the remainder of the range this capacitance varies in response to changes in ambient temperature.

According to a more specific feature of my invention, the thermally deformable element is a bimetallic strip engageable at two spaced-apart locations by the aforementioned stop means, namely by a fixed abutment at a first location and by an adjustable member, such as a screw, at a second location remote therefrom. With the counterelectrode located between these two points of engagement, its position remains practically constant regardless of any thermal stresses produced in the strip at temperatures at which its further deformation is resisted by the fixed abutment. The setting of the adjustable stop member determines the temperature at which the strip, preferably by a free extremity thereof, just touches the fixed abutment in order to determine the threshold which marks the transition between the constant-capacitance band and the variable-capacitance band of the temperature range.

The counterelectrode or armature, which may be defined by or supported on a straight portion of the bimetallic strip adjoining its free extremity, advantageously lies parallel to the planes of the two condenser plates at least upon simultaneous engagement of the strip with both the fixed abutment and the adjustable stop member. If the bimetallic strip is so fastened to the plate support as to deform in a plane perpendicular to the condenser plates, the armature includes an increasing angle with the plates as the strip swings away from its abutment; in this construction, which is particularly suitable for a trimmer condenser of the type disclosed in my prior U.S. Pat. No. 3,659,165, the strip may have a connecting part between its armature portion and its fixed extremity which is cammingly engageable by the screw to vary the temperature threshold. It is, however, also possible to let the strip deform in a plane parallel to the condenser plates whereby the armature maintains its parallelism with these plates in any of its positions.

BRIEF DESCRIPTION OF THE DRAWING

The above and other features of my invention will become apparent from the following detailed description given with reference to the accompanying drawing in which:

FIG. 1 shows three different curves *a* (dot-dash), *b* (dashed) and *c* (solid) representing the frequency variation $\Delta f$, in seconds per day, of a crystal-controlled high-frequency oscillator 46 (FIG. 3) with variations in ambient temperature between about −20° and +60°C. Curve a represents a quartz crystal 47 (FIG. 3) whose resonance frequency deviates from a selected magnitude ($\Delta f = 0$) within limits L, U of ±0.1 sec./day between about +15° and 45°C, rising and dropping rather sharply above and below this temperature range, respectively. The crystal represented by curve *b* has a stable frequency down to about +5°C and up to at least +45°C; the frequency of the crystal represented by curve *c* is stable between about +10° and +60°C. The three curves have a common inversion point P at +30°C; curve *c* may be considered a reference characteristic having a horizontal tangent at the inversion point, this curve being nearly symmetrical about that point within its range of stability.

FIGS. 2 and 3 show a trimmer condenser 49 connected in parallel with crystal 47 for the fine adjustment of the operating frequency of oscillator 46 controlling a clockwork 48 as described in my U.S. Pat. No. 3,659,165. Condenser 49, whose construction is similar to that shown in my prior patent, is supported on a grounded base 1 which forms part of a cylindrical metal housing for crystal 47 and carries on its top a metallic enclosure consisting of a cup-shaped lower half 3 and a complementary upper half 4 of inverted-cup shape. Cup 3, soldered to base 1 by a peripheral seam 5, has two integral lugs 3*b* and 3*c* extending in diametrically opposite directions. These lugs are provided with threaded bores respectively accommodating a pair of screws 6*a*, 6*b* whose enlarged heads bear from above upon a toothed peripheral flange 16 of cup 4 to clamp the latter in position. Lug 3*b* is further provided with an unthreaded bore 3*e* adopted to receive a reduced end of a toothed stem engageable with the toothed flange 13 to act as a driving pinion therefor, as illustrated in my prior patent, for manual rotation directly with the fingers or by means of a screwdriver. Such rotation, upon a loosening of the screws 6*a* and 6*b*, entrains the cup 4 so as to turn it with reference to cup 3 about their common axis indicated at 0 in FIG. 2.

Figure 1:
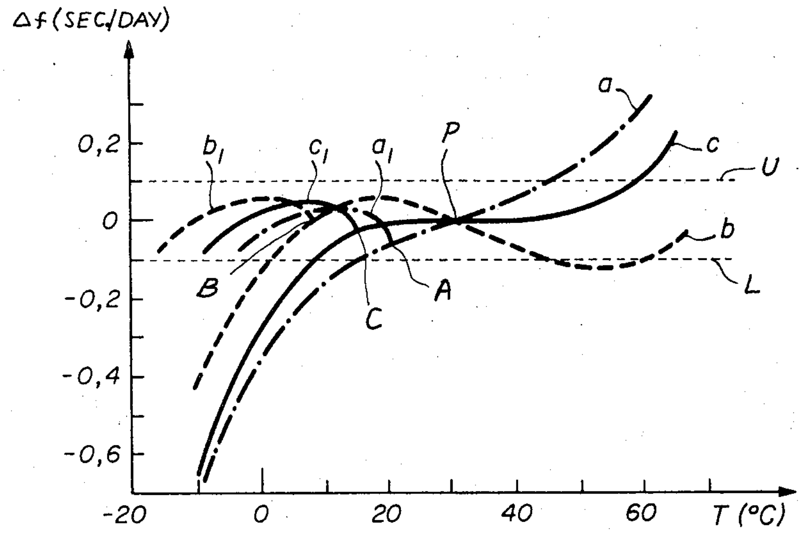
FIG. 1 is a graph showing the temperature/frequency characteristics of three different AT-cut quartz crystals.

Cup 3, which has a peripheral cutout 3*a* for the passage of a wire 11 soldered at 2*a* to the ungrounded lead 2 of cyrstal 47, has an inner peripheral rabbet 8 forming a seat for a glass plate 9 in the shape of a circular disk. The rabbet 8 is bounded by a peripheral wall 7 receiving with sliding fit the rim 4*a* of the upper cup 4, this rim bearing from above upon the plate 9 to lock it in place when the cup 4 itself is gripped by the clamping screws 6*a* and 6*b*. A diametrical slot 4b in the upper surface of enclosure member 4 facilitates its direct rotation, by a screwdriver or the like, for coarse adjustment of its position relative to member 3.

Figure 2:
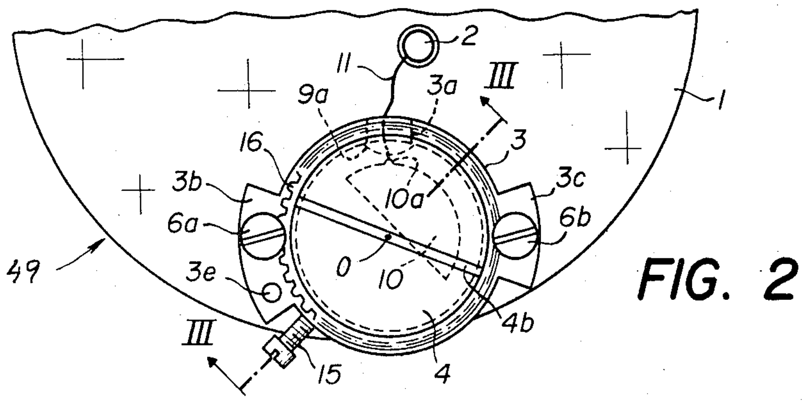
FIG. 2 is a fragmentary top view of a trimmer condenser according to the present invention.

Plate 9 carries a thin layer 10 of conductive material, such as a metallic coating applied to it by spraying, plating, vapor deposition or other conventional techniques, which is conductively connected at 10a to wire 11 and is of generally semicircular shape as seen in FIG. 2. The radius of this layer is substantially less than that of disk-shaped plate 9 so that its arcuate boundary is separated by a uniform distance from the metallic enclosure 3, 4. Plate 9 is peripherally recessed at 9*a* to give clearance to the wire 11 which, of course, must be suitably insulated against contact with the grounded enclosure 3, 4. Layer 10 confronts, with small clearance, a boss 12 integrally depending from the upper enclosure member 4, the two air-spaced surfaces of the layer and the boss thus constituting a pair of parallel condenser plates. The outline of boss 12 is substantially identical with that of layer 10 so that the two surfaces are in full registry in their position of alignment. Since both elements 10 and 12 are eccentrically disposed with reference to the axis of rotation, any rotary movement of member 4 with reference to member 3 will alter the capacitance therebetween.

The trimmer condenser 49, as so far described and as disclosed in my prior patent, consists in fact of two parallel capacitances, namely that between layer 10 and grounded boss 12 on the one hand and that between this layer and the grounded lower cup 3 on the other hand. In accordance with my present invention, this latter capacitance is made variable by the insertion in cup 3 of a bimetallic blade 13 which is bent into three angularly adjoining parts, namely a short horizontal heel 13*a* mechanically and galvanically fixed to the bottom of the cup, an oblique connecting part 13*b* and a long straight leg 13*c* whose free end underlies an inner annular shoulder 14 near the upper rim of the cup. Shoulder 14 defines with the bottom of cup 3 an annular recess 3d in which the tip of strip 13 is vertically swingable from a limiting upper position, parallel to the condenser plates 10, 12, into a downwardly deflected position illustrated in phantom lines in FIG. 3. A screw 15, threaded into the cup 3 above heel 13*a*, is engageable with connecting part 13*b* so as to exert a camming force urging the armature 13*c* downwardly, i.e., in a direction in which this leg tends to flex upon a lowering of the ambient temperature below a threshold defining the lower limit of a temperature band throughout which strip 13 remains in its rest position illustrated in full lines. The magnitude of this threshold temperature, which lets the free end of the strip just touch the shoulder 14 without pressure, is adjustable by advancing or retracting the screw 15.

Thus, the thermal deformability of the strip 13 has no effect upon the resonance frequency of crystal 47 (as modified by the presence of trimmer condenser 49) within an upper part of the temperature range defined by the tolerance limits U, L for a given frequency characteristic *a, b* or *c*. It will be convenient to select this threshold between the temperature of inversion point P (here 30°C) and the point where the curve intersects the lower range limit L, e.g. at 20°C for curve *a*, 10°C for curve *b* and 15°C for curve *c*. This temperature threshold has been respectively indicated at A, B and C in FIG. 4 in which curves $a^*$, $b^*$ and $c^*$ represent the change in capacitance $\Delta C$ in $10^{-3}$ picofarads between layer 10 and ground for different positions caused by the downward deflection of leg 13*c* for a band of temperatures ranging between $-5°$ and $+20°C$. Above that threshold temperature, i.e., for $\Delta C = 0$, the effective capacitance in the oscillator tank circuit has the value selected by the rotary adjustment of enclosure member 4 so that the operating frequency follows the curve *a*, *b* or *c* shown in FIG. 1.

The modification of the frequency characteristic of the crystal-controlled oscillator by the thermal deformation of strip 13, below the respective threshold A, B or C, has been illustrated in FIG. 1 by curves $a_1$, $b_1$, $c_1$, branching off the curves *a, b* and *c*, respectively. It will be noted that all three frequency characteristics, as thus modified, extend well into the region of negative temperatures before reaching the lower tolerance limit L. Since the threshold temperature can be selected merely by turning the screw 15, trimmer condenser 49 can be easily adapted to any piezoelectric crystal having a frequency characteristic generally similar to those shown at *a, b* and *c*.

Figure 3:
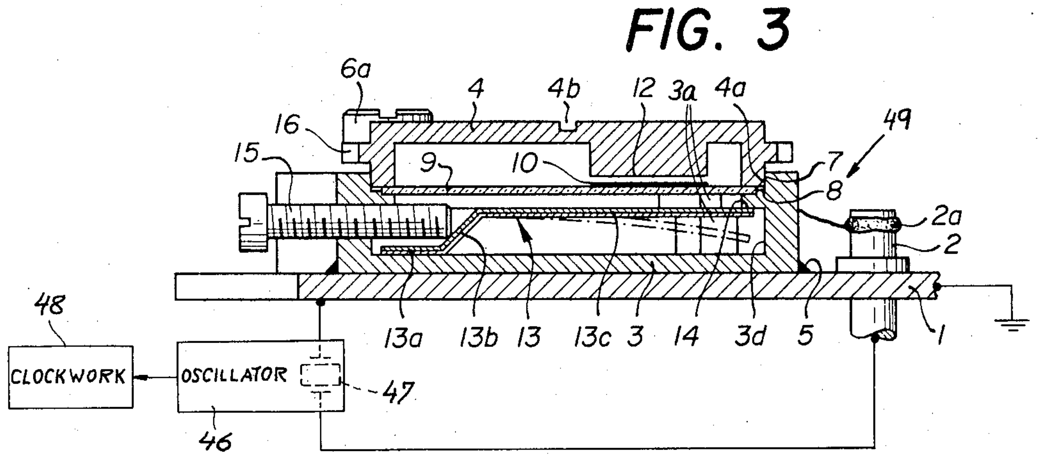
FIG. 3 is a cross-sectional view taken along line III—III of FIG. 2.
Figure 5:
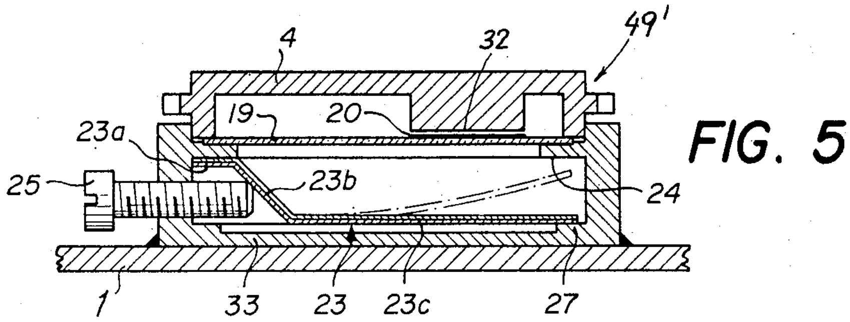
FIG. 5 is a view similar to that of FIG. 3, illustrating a modification.

In FIG. 5 I have shown a modified trimmer condenser 49' in which elements 19, 20, 32, 23, 24, 25, 33 and 34 respectively correspond to elements 9, 10, 12, 13, 14, 15, 3 and 4 of FIGS. 2 and 3. Bimetallic strip 23 is again divided into three parts 23*a*, 23*b* and 23*c*, this strip being so constituted as to flex upwardly in response to rising temperatures from its full-line position into which it is inherently biased below a threshold temperature selected by screw 25. It will be noted that, again, the straight long leg or armature 23*c* of the strip (acting as a counterelectrode) parallels the condenser plates 20 and 32 in its position of rest in which its free end bears upon an inner annular shoulder 27 near the bottom of cup 33.

Figure 6:
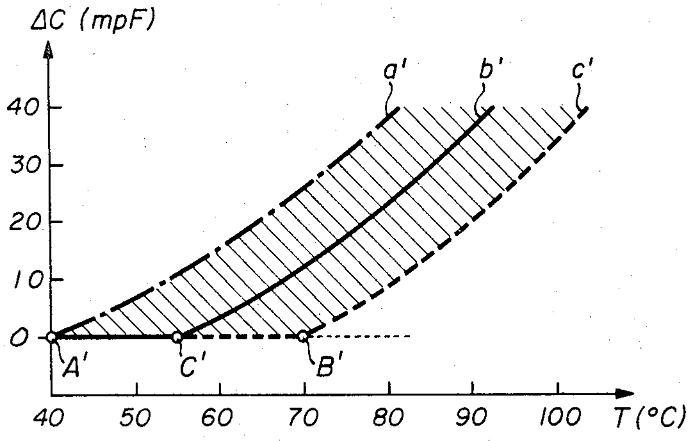
FIG. 6 is a graph similar to that of FIG. 4, illustrating the mode of operation of the condenser of FIG. 5.
Figure 7:
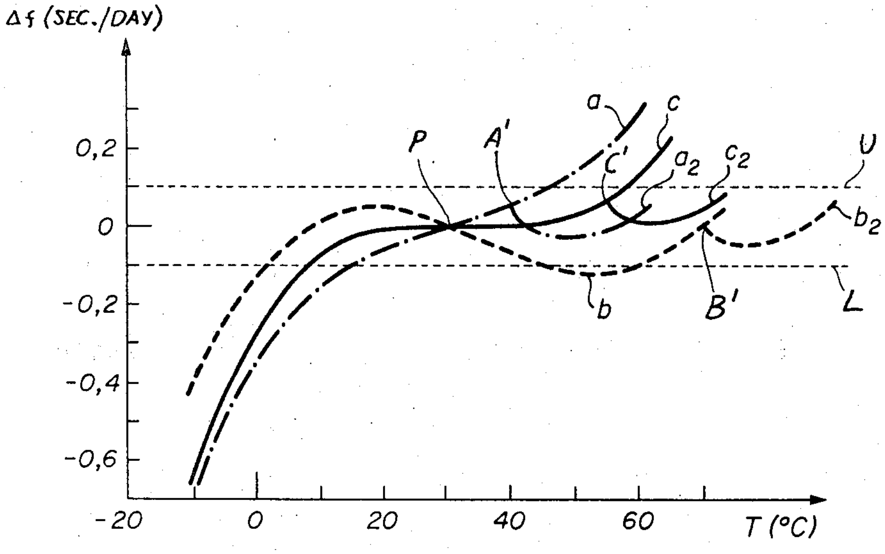
FIG. 7 is a graph similar to that of FIG. 1 but relating to the modification of FIG. 5.

FIG. 6 shows thresholds A', B'0 and C' of +40°, +55° and +70°, respectively, established with the aid of screw 25 to provide a supplemental capacitance which varies along curves *a'*, *b'* and *c'* for higher temperatures; these thresholds lie between the inversion point P and the points at which curves *a, b* and *c* intersect the upper tolerance limit U. In FIG. 7 I have illustrated the corresponding branch curves $a_2$, $b_2$, $c_2$ which extend the characteristics *a, b* and *c* into the region of higher temperatures between tolerance limits U and L.

It will be understood that a single trimmer condenser, connected in parallel with crystal 47, may be provided with a pair of bimetallic blades 13, 23 for the purpose of extending the range of stabilization of the high-frequency oscillator 46 both downwardly and upwardly as illustrated in FIGS. 1 and 7. In the case of characteristic b the lower tolerance limit L is breached in the region of 50°C, but only to an insignificant extent.

Figure 8:
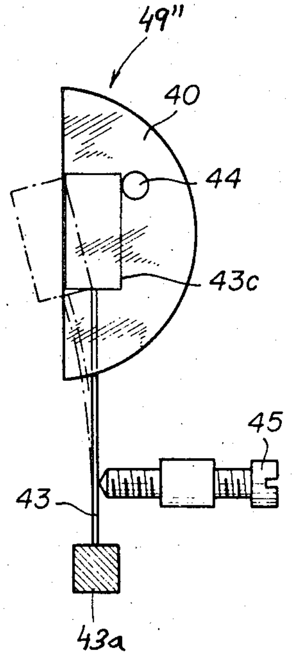
FIG. 8 is a top view of another embodiment of the present invention.

FIG. 8 shows part of another trimmer condenser 49'' according to the invention in which a bimetallic strip 43, fixedly anchored at 43*a*, is thermally deflectable in a plane parallel to a flat electrode 40 which may be the fixed plate of a pair of relatively rotatable condenser plates of semicircular shape. An armature 43*c*, carried on the free end of strip 43 as a counterelectrode adjacent the plate 40, rests against a fixed abutment 44 in a predetermined band of temperatures bounded by a threshold whose magnitude is again adjustable with the aid of a screw 45. Below that temperature threshold, strip 43 flexes away from abutment 44 so that counterelectrode 43*c* moves out of register with condenser plate 40 to reduce the supplemental capacitance in the manner discussed with reference to FIGS. 1–4. Naturally, the arrangement of FIG. 8 can also be reversed so that such flexure increases the capacitance, with the bimetallic strip constructed to bend away from its abutment at temperatures above the threshold; condenser 49'' would then operate in the manner discussed above with reference to FIGS. 5–7.

Figure 4:
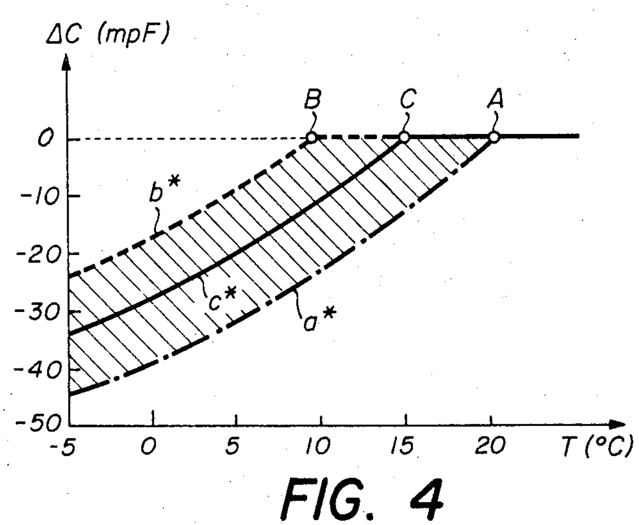
FIG. 4 is another graph illustrating the mode of operation of the trimmer condenser of FIGS. 2 and 3.

In the rest position of bistable element 13 or 23 shown in full lines in FIGS. 3 or 5, the supplemental capacitance $C_o$ introduced by this member between condenser plate 10 or 20 and ground is very low so that, even with the small values of $\Delta C$ indicated in FIGS. 4 and 6, the frequency-determining ratio $\Delta C/C_o$ is significant over the long run. However, brief displacements of armature 13c or 23c in response to impact have no appreciable effect upon the operating frequency of oscillator 46 and therefore upon the chronometry of clockwork 48.

I claim:

1. A variable-capacitance trimmer condenser for a clockwork controlled by an electronic oscillator provided with a frequency-determining crystal, comprising a pair of relatively adjustable plates, a thermally deformable element provided with an armature confronting one of said plates and defining therewith a supplemental capacitance, said armature being movable relatively to said one of said plates for varying said supplemental capacitance in response to changes in ambient temperature, and stop means engageable by said element in a position thereof corresponding to a predetermined temperature threshold for preventing thermal displacement of said armature in a band of ambient temperatures bounded by said threshold whereby said supplemental capacitance varies only with temperatures outside said band.

2. A trimmer condenser as defined in claim 1 wherein said stop means is adjustable for varying said threshold.

3. A trimmer condenser as defined in claim 2 wherein said element comprises a bimetallic strip, said stop means including a fixed abutment engageable with said strip at a first location and an adjustable member engageable with said strip at a second location remote from said first location.

4. A trimmer condenser as defined in claim 3 wherein said armature is disposed between said first and second locations on said strip.

5. A trimmer condenser as defined in claim 4 wherein said plates include a stationary plate and a movable plate lying in parallel planes, said armature being parallel to said plates at least upon simultaneous engagement of said strip with both said abutment and said adjustable stop.

6. A trimmer condenser as defined in claim 5 wherein said stationary plate is disposed next to said strip between the latter and said movable plate.

7. A trimmer condenser as defined in claim 6 wherein said stationary plates is provided with a support, said adjustable member being a screw threaded into said support.

8. A trimmer condenser as defined in claim 6, further comprising a conductive enclosure for said plates and said strip, said abutment being part of said enclosure, said strip and said movable plate being conductively connected to said enclosure, said stationary plate being galvanically insulated from said enclosure.

9. A trimmer condenser as defined in claim 8 wherein said armature is a straight portion of said strip terminating in a free extremity engageable with said abutment, said strip having an opposite extremity fixed to said enclosure and a connecting part between said opposite extremity and said straight portion, said adjustable member being cammingly engageable with said connecting part.

10. In combination, a clockwork, an electronic oscillator provided with a frequency-determining crystal controlling said clockwork, and a trimmer condenser as defined in claim 1 connected in parallel with said crystal.

* * * * *